(12) United States Patent
Wu et al.

(10) Patent No.: US 12,436,418 B2
(45) Date of Patent: Oct. 7, 2025

(54) ANTI-PEEP DISPLAY SCREEN, VEHICLE-MOUNTED DISPLAY DEVICE AND VEHICLE

(71) Applicant: VARITRONIX (HEYUAN) DISPLAY TECHNOLOGY LTD., Heyuan (CN)

(72) Inventors: Minyi Wu, Heyuan (CN); Karmun Wan, Heyuan (CN); Wei Wang, Heyuan (CN); Jingcai Bai, Heyuan (CN); Jiying Yang, Heyuan (CN); Binbin Wu, Heyuan (CN); Kui Tang, Heyuan (CN)

(73) Assignee: VARITRONIX (HEYUAN) DISPLAY TECHNOLOGY LTD., Heyuan (CN)

( * ) Notice: Subject to any disclaimer, the term of this patent is extended or adjusted under 35 U.S.C. 154(b) by 0 days.

(21) Appl. No.: 18/539,806

(22) Filed: Dec. 14, 2023

(65) Prior Publication Data
US 2025/0060621 A1     Feb. 20, 2025

(30) Foreign Application Priority Data
Aug. 16, 2023   (CN) .......................... 202311034766.7

(51) Int. Cl.
*G02F 1/13* (2006.01)
*B60K 35/22* (2024.01)
(Continued)

(52) U.S. Cl.
CPC ............ *G02F 1/1323* (2013.01); *B60K 35/22* (2024.01); *G02F 1/133638* (2021.01);
(Continued)

(58) Field of Classification Search
CPC .............................. G02F 1/1323; G02F 1/1347
See application file for complete search history.

(56) References Cited

U.S. PATENT DOCUMENTS

| 8,045,097 B2 | 10/2011 | Sakai et al. |
| 2009/0174843 A1 | 7/2009 | Sakai et al. |

(Continued)

FOREIGN PATENT DOCUMENTS

| CN | 101427177 A | 5/2009 |
| CN | 204790254 U | 11/2015 |

(Continued)

OTHER PUBLICATIONS

Extended European Search Report for EP Application No. 23214888. 2; Mailing Date, May 7, 2024.
(Continued)

*Primary Examiner* — Alexander P Gross
(74) *Attorney, Agent, or Firm* — CANTOR COLBURN LLP (57) ABSTRACT

Provided is an anti-peep screen, including a passive LCD module and a color LCD module stacked along a first direction; the passive LCD module includes a first electrode layer, a liquid crystal layer and a second electrode layer, the first electrode layer comprises a first sub-electrode, the second electrode layer comprises a second sub-electrode, and the first sub-electrode is opposite to the second sub-electrode and configured to input different voltages, so as to control a light transmission state of the passive LCD module. The anti-peep display screen of the present application solves the problems of poor display effect and single anti-peep function of existing anti-peep display screens by introducing a passive LCD module. Also provided is a vehicle-mounted display device and a vehicle.

10 Claims, 6 Drawing Sheets

(51) Int. Cl.
*G02F 1/13363* (2006.01)
*G02F 1/1343* (2006.01)
*G02F 1/1347* (2006.01)

(52) U.S. Cl.
CPC ...... *G02F 1/134309* (2013.01); *G02F 1/1347* (2013.01); *B60K 2360/33* (2024.01); *G02F 2413/01* (2013.01)

(56) References Cited

U.S. PATENT DOCUMENTS

| | | | |
|---|---|---|---|
| 2019/0146134 A1* | 5/2019 | Miura | G02F 1/0316 |
| | | | 349/84 |
| 2019/0353943 A1* | 11/2019 | Smith | G02F 1/133528 |
| 2020/0326567 A1* | 10/2020 | Fang | G02F 1/1323 |
| 2022/0155631 A1 | 5/2022 | Xin et al. | |
| 2022/0229320 A1 | 7/2022 | Dong et al. | |
| 2022/0269128 A1* | 8/2022 | Matsushima | G02F 1/1323 |
| 2023/0176405 A1 | 6/2023 | Chen et al. | |
| 2023/0375863 A1* | 11/2023 | Woodgate | G02F 1/133636 |

FOREIGN PATENT DOCUMENTS

| | | | | |
|---|---|---|---|---|
| CN | 111323946 A | * | 6/2020 | ........... G02F 1/1323 |
| CN | 114049866 A | | 2/2022 | |
| CN | 114442344 A | * | 5/2022 | ........... G02F 1/0121 |
| CN | 115616820 A | | 1/2023 | |
| CN | 219065932 U | | 5/2023 | |
| CN | 220543234 U | | 2/2024 | |
| JP | 2006330164 A | | 12/2006 | |
| KR | 19990074569 A | | 10/1999 | |
| KR | 20100050632 A | | 5/2010 | |

OTHER PUBLICATIONS

Chinese Office Action corresponding to CN Application No. 202311034766.7; Issue date, May 1, 2025, 10 pages.

* cited by examiner

ANTI-PEEP DISPLAY SCREEN, VEHICLE-MOUNTED DISPLAY DEVICE AND VEHICLE

CROSS-REFERENCE TO RELATED APPLICATIONS

This application claims the benefit of Chinese patent application No. 202311034766.7 filed on Aug. 16, 2023, the contents of which are incorporated herein by reference.

TECHNICAL FIELD

The present application relates to the technical field of display technology, and in particular, to an anti-peep display screen, a vehicle-mounted display device and a vehicle.

BACKGROUND

The anti-peep display utilizes special optical technology that, by limiting the viewing angle of the screen, the screen content can only be clearly seen from directly facing the screen. When the screen is viewed from other angles, the content will become blurred, effectively protecting the screen from peeping by surrounding people.

Currently, most common anti-peep display screens use the principle of blinds by controlling the grating spacing between 0.02 mm and 0.1 mm to achieve the anti-peep effect through the grating structures arranged side by side. Limited by the anti-peep structure and this principle, this type of anti-peep display screen has a poor display effect and a single anti-peep function.

SUMMARY

The present application provides an anti-peep display screen, a vehicle-mounted display device and a vehicle, to solve the problems of poor display effect and single anti-peep function of existing anti-peep display screens.

In a first aspect, the present application provides an anti-peep display screen, including a passive crystal display (LCD) module and a color LCD module stacked along a first direction. The passive LCD module includes a first electrode layer, a liquid crystal layer and a second electrode layer. The first electrode layer includes a first sub-electrode. The second electrode layer includes a second sub-electrode. The first sub-electrode is opposite to the second sub-electrode and configured to input different voltages, so as to control a light transmission state of the passive LCD module.

In an embodiment, the first electrode layer includes a plurality of independent first sub-electrodes, and the plurality of first sub-electrodes is configured to input different voltages to independently control the light transmission state of the passive LCD module in areas where the plurality of first sub-electrodes are located.

In an embodiment, the second electrode layer includes a plurality of second sub-electrodes, each of the plurality of second sub-electrodes has the same size as each of the plurality of first sub-electrodes, and the plurality of second sub-electrodes are arranged corresponding to the plurality of first sub-electrodes, respectively.

In an embodiment, the number of the second sub-electrode in the second electrode layer includes is one, and a projection of the second sub-electrode on the first electrode layer covers the plurality of first sub-electrodes.

In an embodiment, the first electrode layer includes one first sub-electrode, and the second electrode layer includes one second sub-electrode opposite to the first sub-electrode.

In an embodiment, the number of the passive LCD module in the anti-peep display screen is one or two.

In an embodiment, the anti-peep display screen includes two passive LCD modules, and a compensation film is disposed between the two passive LCD modules. The compensation film is a half-wave plate.

In an embodiment, the passive LCD module is a twisted nematic display module or an electronically controlled birefringence display module.

In an embodiment, a pretilt angle of liquid crystal molecules in the twisted nematic display module is 1°-7°, a twist angle thereof is 80°-100°, and a retardation is 500 nm-1200 nm. A pretilt angle of liquid crystal molecules in the electronically controlled birefringence display module is 1°-7°, and a retardation is 500 nm-1200 nm.

In an embodiment, the color LCD module includes a plurality of pixel electrodes, and the first sub-electrode is arranged corresponding to at least one of the pixel electrodes.

In an embodiment, a compensation film is provided between the passive LCD module and adjacent color LCD module, and the compensation film is a half-wave plate.

In an embodiment, the anti-peep display screen further includes a backlight source, and the backlight source includes a light source, a first light-enhancing film, and a second light-enhancing film disposed along the first direction, an angle between optical axes of the first light-enhancing film and the second light-enhancing film is 0°-90°; alternatively, the backlight source includes a light source, a first light-enhancing film, and a brightness-enhancing film disposed along the first direction, and an angle between optical axes of the first light-enhancing film and the brightness-enhancing film is 0°-90°.

In the anti-peep display screen provided by the present application, a passive LCD module is used in combination with a color LCD module, and the passive LCD module includes a first electrode layer, a liquid crystal layer, and a second electrode layer, the first electrode layer includes a first sub-electrode, and the second electrode layer includes a second sub-electrode. By regulating the voltage difference between the first sub-electrode and the second sub-electrode, the deflection angle of the liquid crystal molecules in the liquid crystal layer can be controlled, thereby controlling the transmission state of the passive LCD module and enabling the anti-peep function to be turned on or off. During this process, the color LCD module functions normally, so that the image display quality of the anti-peep display screen can be ensured while realizing the anti-peep function. In some situations, the number and shape of the first sub-electrode and the second sub-electrode can also be designed to realize various forms of anti-peep function.

In a second aspect, the present application provides a vehicle-mounted display device, including the anti-peep display screen in the first aspect.

The vehicle-mounted display device provided by the present application improves the structure of conventional anti-peep display screens. On the one hand, by combining a passive LCD module with a color LCD module and utilizing the passive LCD module to turn on or off the anti-peep function, the image display quality of the vehicle-mounted display device can be effectively improved; on the other hand, in some situations, the structure of the sub-electrodes is allowed to be customized to realize various forms of anti-peep function.

In a third aspect, the present application provides a vehicle, including the vehicle-mounted display device in the second aspect.

The vehicle provided by the present application can provide more entertainment to front-seat passengers without affecting the driver's driving safety by means of a vehicle-mounted display module with an anti-peep function.

BRIEF DESCRIPTION OF THE DRAWINGS

In order to more clearly illustrate the technical proposals in embodiments of the present application, accompanying drawings that are used in the description of the embodiments are briefly introduced hereinbelow. Obviously, the drawings in the following description are merely some embodiments of the present application. For those skilled in the art, other drawings can also be obtained according to these drawings without any creative effort.

FIG. 7 is a schematic structural diagram of the passive LCD module shown in FIG. 6 when the anti-peep function is turned on;

FIG. 9 is a schematic structural diagram of the passive LCD module shown in FIG. 8 when the anti-peep function is turned on;

FIG. 11 is a schematic structural diagram of the passive LCD module shown in FIG. 10 when the anti-peep function is turned on;

FIG. 13 is a schematic structural diagram of the passive LCD module shown in FIG. 12 when the anti-peep function is turned on;

FIG. 15 is a schematic structural diagram of the passive LCD module shown in FIG. 14 when the anti-peep function is turned on;

FIG. 17 is a schematic structural diagram of the passive LCD module shown in FIG. 16 when the anti-peep function is turned on;

REFERENCE SIGNS ARE AS FOLLOWS 1 passive LCD module, 11 first electrode layer, 111 first sub-electrode, 12 liquid crystal layer, 121 liquid crystal molecule, 13 second electrode layer, 131 second sub-electrode electrode, 14 glass substrate, 15 first surface polarizer, 16 first bottom polarizer, 2 color LCD module, 21 second surface polarizer, 22 second bottom polarizer, 3 backlight source, 31 light source, 32 first light-enhancing film, 33 second light-enhancing film, 34 brightness-enhancing film, 35 bracket, 36 reflective film, 37 scattering film, 4 compensation film, and 5 cover plate.

DETAILED DESCRIPTION OF THE EMBODIMENTS

In order to make the purpose, technical proposals, and advantages of the present application more clearly understood, the present application will be described in further detail hereinbelow with reference to the accompanying drawings and embodiments. It should be understood that the specific embodiments described here are merely used to explain the present application but not to limit the present application.

It should be noted that when a component is referred to as being "fixed to" or "disposed on" another component, it may be directly or indirectly disposed on the other component. When a component is referred to as being "connected to" another component, it may be directly or indirectly connected to the other component. The orientation or positional relationship indicated by the terms "upper", "lower", "left", "right", etc. are based on the orientation or positional relationship shown in the drawings, and are merely for the convenience of description and do not indicate or imply the device or elements to which they are referred must have a specific orientation, be constructed and operate in a specific orientation, and therefore cannot be construed as a limitation on the application. The terms "first" and "second" are merely used for the convenience of description and cannot be understood as indicating or implying relative importance or implicitly indicating the quantity of technical features. "A plurality of" means two or more, unless otherwise expressly and specifically limited.

Reference in the specification of the present application to "one embodiment", "some embodiments", or "an embodiment" means that a particular feature, structure, or characteristic described in connection with the embodiment is included in one or more embodiments of the application. Therefore, the phrases "in one embodiment", "in some embodiments", "in other embodiments", "in another embodiment", etc. appearing in different places in this specification are not necessarily referred to the same embodiment, but rather to "one or more but not all embodiments" unless specifically stated otherwise. Furthermore, the particular features, structures, or characteristics may be combined in any suitable manner in one or more embodiments.

Embodiment 1

This embodiment provides an anti-peep display screen, which is applied in products or components with display functions such as LCD TVs, mobile phones, tablets, and vehicle monitors, and has a partitioned anti-peep function.

Figure 1:
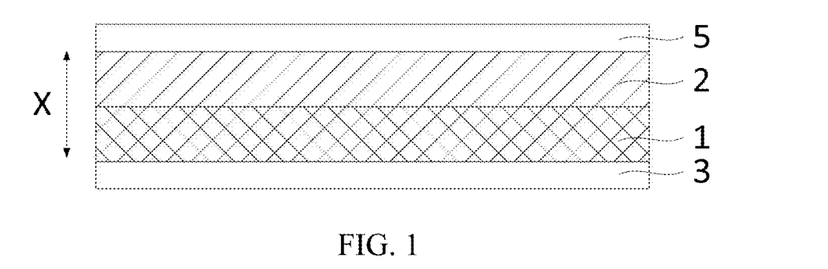
FIG. 1 is a schematic structural diagram of an anti-peep structure according to an embodiment of the present application.
Figure 6:
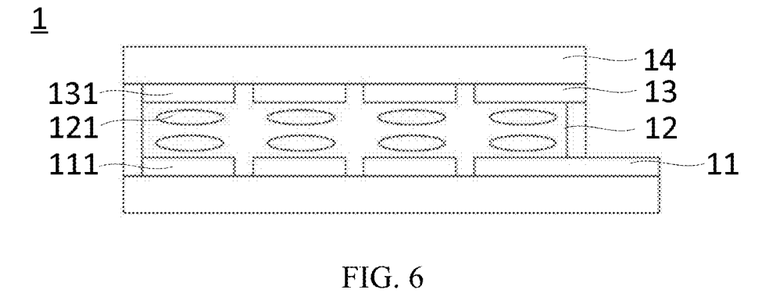
FIG. 6 is a schematic structural diagram of an electronically controlled birefringence passive LCD module when the anti-peep function is turned off according to Embodiment 1 of the present application.

As shown in FIG. 1, the anti-peep display screen provided by the present application includes a passive LCD module 1 and a color LCD module 2 stacked along a first direction (direction indicated by X in FIG. 1). As shown in FIG. 6, the passive LCD module 1 includes a first electrode layer 11, a liquid crystal layer 12, and a second electrode layer 13. The first electrode layer 11 includes a first sub-electrode 111, and the second electrode layer 13 includes a second sub-electrode 131, the first sub-electrode 111 and the second sub-electrode 131 are opposite to each other and configured to input different voltages to control the light transmission state of the passive LCD module 1.

The passive LCD module 1 is a passive display module, and the color LCD module 2 is a TFT-LCD.

In the passive LCD module 1, the first electrode layer 11 and the second electrode layer 13 are made of a transparent conductive material and are respectively arranged on opposite sides of the liquid crystal layer 12. The first electrode layer 11 may be disposed on a side close to the backlight source 3, or may also be disposed on a side away from the backlight source 3. The liquid crystal layer 12 includes liquid crystal molecules 121 distributed between the first electrode layer 11 and the second electrode layer 13. In a natural state, the liquid crystal molecules 121 are aligned parallel to the first electrode layer 11 and the second electrode layer 13.

The first electrode layer 11 includes a first sub-electrode 111, and the second electrode layer 13 includes a second sub-electrode 131. By applying a voltage to the first electrode layer 11 and/or the second electrode layer 13, it is possible to form an electric field in the liquid crystal layer 12, and this electric field acts on the liquid crystal molecules 121, which can change the alignment of the liquid crystal molecules 121, thereby controlling the light transmission state of the liquid crystal layer 12, and enabling the anti-peep function to be turned on or off.

Figure 7:
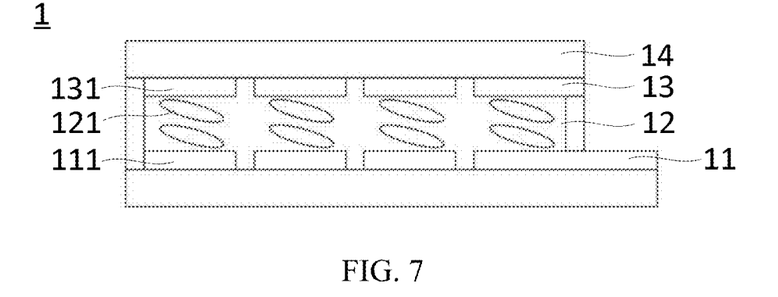

Specifically, as shown in FIG. 6, when the voltage difference between the first sub-electrode 111 and a corresponding second sub-electrode 131 is zero, light incident from both the side and the vertical direction can pass through the liquid crystal layer 12. In this case, the anti-peep function is turned off, and the anti-peep display screen has good visual effects at all viewing angles. As shown in FIG. 7, when a certain voltage difference is applied between the first sub-electrode 111 and the corresponding second sub-electrode 131, the liquid crystal molecules 121 can be tilted to a certain angle, that is, the liquid crystal molecules 121 are deflected relative to the liquid crystal surface in a direction perpendicular to the plane of the liquid crystal layer 12. When the liquid crystal molecules 121 are tilted to a certain angle, the light incident from the side is refracted, reflected, or absorbed in the liquid crystal layer 12 and is thus blocked, while the vertical incident light is not affected. In this case, the anti-peep function is turned on, and the content on the anti-peep display becomes blurred or invisible when viewing from the side, while the contents of the anti-peep display remain clearly visible at the vertical viewing angle.

In the anti-peep display screen provided by the present application, the passive LCD module 1 is utilized in combination with the color LCD module 2, and the passive LCD module 1 includes the first electrode layer 11, the liquid crystal layer 12, and the second electrode layer 13. The first electrode layer 11 includes the first sub-electrode 111, and the second electrode layer 13 includes the second sub-electrode 131. By regulating the voltage difference between the first sub-electrode 111 and the second sub-electrode 131, the deflection angle of the liquid crystal molecules 121 in the liquid crystal layer 12 can be controlled, thereby controlling the light transmission state of the passive LCD module 1 and realizing the on/off of the anti-peep function. During this process, the color LCD module 2 functions normally, so that the image display quality of the anti-peep display screen can be ensured while realizing the anti-peep function. In some cases, the number and shape of the first sub-electrode 111 and the second sub-electrode 131 may also be designed to achieve various forms of the anti-peep function.

In the embodiment provided by the present application, as shown in FIG. 6, the first electrode layer 11 includes a plurality of independent first sub-electrodes 111. The plurality of first sub-electrodes 111 can be configured to input different voltages to independently control the light transmission state of the passive LCD module 1 in respective areas where the plurality of first sub-electrodes 111 are located.

The plurality of first sub-electrodes 111 are connected to different drive circuits, controlled by the same signal or different signals, and can input the same or different voltages.

Specifically, in some situations, by regulating the input voltages of the plurality of first sub-electrodes 111, a voltage difference can be formed between the first sub-electrodes 111 (that is, part of the first sub-electrodes 111) and the second sub-electrodes 131 in a target area, while the voltage difference between the first sub-electrodes 111 and the second sub-electrodes 131 outside the target area is zero, so as to individually turn on the anti-peep function of the target area, thereby realizing a partial anti-peep function on the anti-peep display screen.

The above design allows independent control of the light transmission state of the passive LCD module 1 in the area where the plurality of first sub-electrodes 111 are located, thereby independently controlling the on/off of the anti-peep function of the anti-peep display screen in the areas where the plurality of first sub-electrodes 111 are located. Therefore, the independent control of the anti-peep function in multiple areas of the anti-peep display screen can be achieved.

In the embodiment provided by the present application, the color LCD module 2 includes a plurality of pixel electrodes, and the first sub-electrodes 111 are arranged corresponding to at least one of the pixel electrodes.

The first sub-electrodes 111 are block-shaped, and each first sub-electrode 111 may correspond to one or more pixel electrodes according to the structure anti-peep requirements of the anti-peep display screen. Optionally, in one embodiment, the anti-peep display screen is divided into three areas along the horizontal direction, and the first electrode layer 11 is correspondingly configured with three separate first sub-electrodes 111.

With the above design, the structure of the first sub-electrodes 111 matches the resolution of the color LCD module 2, which aids in improving the display effect of the anti-peep display screen under the anti-peep state.

In the embodiment provided by the present application, the plurality of first sub-electrodes 111 are arranged in an array, and the spacing between adjacent first sub-electrodes 111 is 3 μm-10 μm.

The above design can further improve the matching between the structure of the first sub-electrodes 111 and the color LCD module 2, thereby conducive to improving the display effect of the anti-peep display screen under the anti-peep state.

In the embodiment provided by the present application, as shown in FIG. 7, the second electrode layer 13 includes a plurality of second sub-electrodes 131, and the second sub-electrodes 131 are the same size as the first sub-electrodes 111. The plurality of second sub-electrodes 131 are arranged corresponding to the plurality of first sub-electrodes 111, respectively.

Specifically, the size, shape, and number of the second sub-electrodes 131 are the same as those of the first sub-electrodes 111. Each first sub-electrode 111 corresponds to a second sub-electrode 131. The first sub-electrode 111, the second sub-electrode 131, and the liquid crystal molecules 121 therebetween together form a functional unit.

The above design aids in improving the accuracy of independent control of each functional unit.

In the embodiment provided by the present application, when the first electrode layer 11 includes a plurality of first sub-electrodes 111 and the second electrode layer 13 includes a plurality of second sub-electrodes 131, the control method for the voltage between the first sub-electrode 111 and the second sub-electrode 131 is not limited.

In some embodiments, the plurality of first sub-electrodes 111 are connected to different drive circuits, controlled by the same signal or different signals, and configured to input the same or different voltages. The plurality of second sub-electrodes 131 are connected to the same drive circuit, and are controlled by the same signal and configured to input the same voltage.

In some embodiments, the plurality of first sub-electrodes 111 are connected to different drive circuits, controlled by the same signal or different signals, and configured to input the same or different voltages; the plurality of second sub-electrodes 131 are connected to different drive circuits. The plurality of second sub-electrodes 131 are connected to different drive circuits, controlled by the same signal or different signals, and configured to input the same or different voltages.

In the embodiments provided by the present application, the structure and display mode of the liquid crystal layer 12 in the passive LCD module 1 are not limited.

Figure 8:
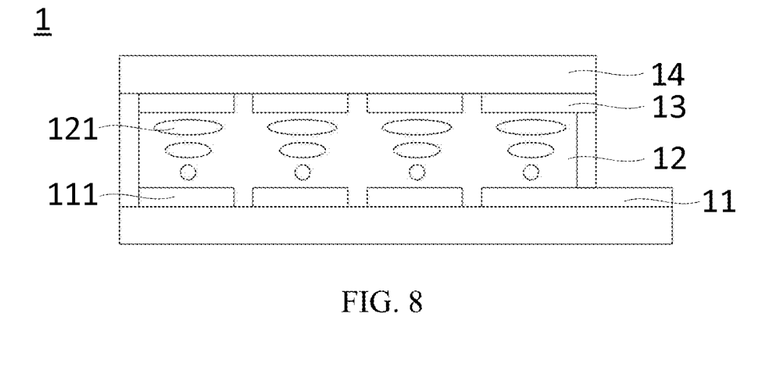
FIG. 8 is a schematic structural diagram of a vertical nematic passive LCD module when the anti-peep function is turned off according to Embodiment 1 of the present application.
Figure 9:
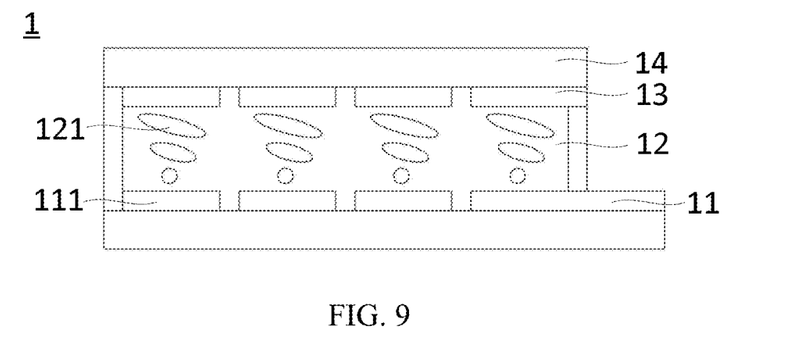

In some embodiments, as shown in FIGS. 8 and 9, the passive LCD module 1 is a twisted nematic display module. The pretilt angle of the liquid crystal molecules 121 in the twisted nematic display module is 1°-7°, the twist angle is 80°-100°, and the retardation is 500 nm-1200 nm.

The twisted nematic LCD module has good display performance and the advantages of low energy consumption, low cost and fast response speed. When used in the anti-peep display screen, it can effectively improve product quality and service life.

In some embodiments, as shown in FIGS. 6 and 7, the passive LCD module 1 is an electronically controlled birefringence display module. The pretilt angle of the liquid crystal molecules 121 in the electronically controlled birefringence display module is 1°-7°, and the retardation is 500 nm-1200 nm.

The electronically controlled birefringent display module has the advantages of small size, light weight, low power consumption, and good light transmission effect. When used in the anti-peep display screen, it can help improve the picture quality.

In the embodiments provided by the present application, the number of passive LCD modules 1 is not limited.

Figure 2:
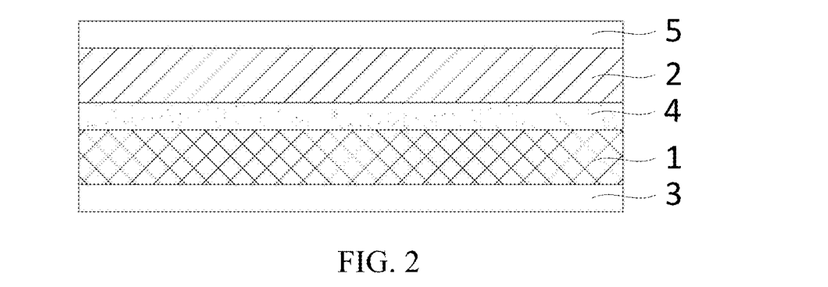
FIG. 2 is a schematic structural diagram of another anti-peep structure according to an embodiment of the present application.

In some embodiments, as shown in FIGS. 1 and 2, the anti-peep display screen includes a passive LCD module 1. The passive LCD module 1 may be a twisted nematic display module or an electronically controlled birefringence display module.

Figure 3:
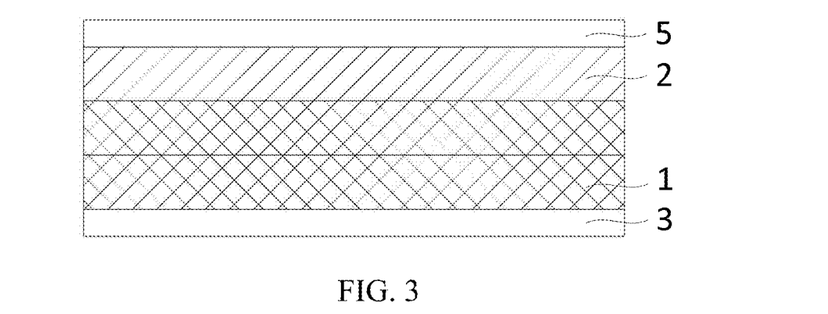
FIG. 3 is a schematic structural diagram of yet another anti-peep structure according to an embodiment of the present application.
Figure 4:
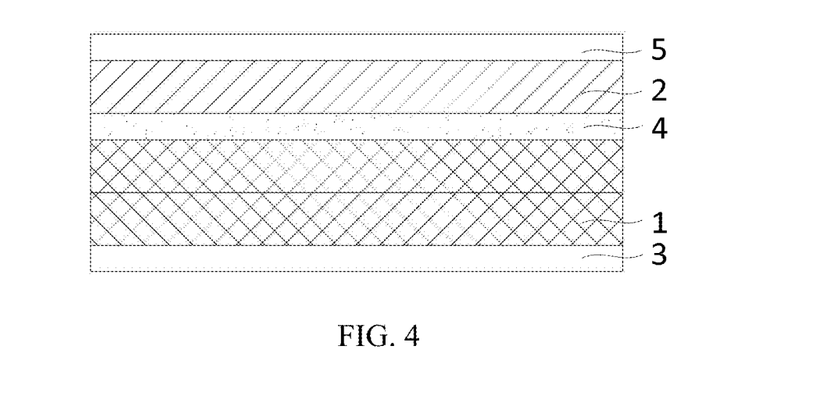
FIG. 4 is a schematic structural diagram of still yet another anti-peep structure according to an embodiment of the present application.
Figure 5:
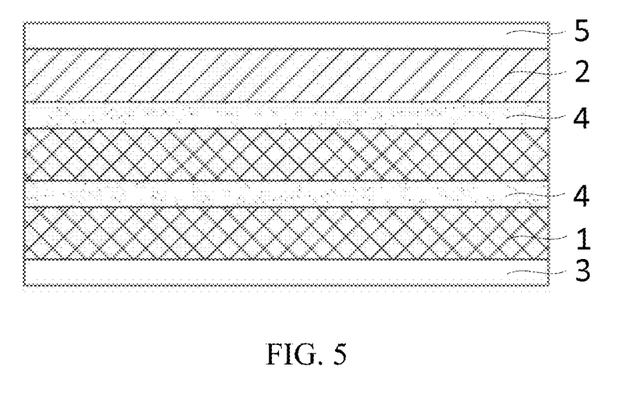
FIG. 5 is a schematic structural diagram of still yet another anti-peep structure according to an embodiment of the present application.

In some embodiments, as shown in FIGS. 3, 4 and 5, the anti-peep display screen includes two passive LCD modules 1. The two passive LCD module 1 may be any of a twisted nematic display module and an electronically controlled birefringence display module.

By combining the plurality of passive LCD modules 1 and the color LCD module 2, the light transmission state can be optimized, and the blocking effect of side incident light in the anti-peep state can be further improved, thereby improving the partitioned anti-peep effect.

It can be understood that the actual number of passive LCD modules 1 needs to refer to the anti-peep requirements, product appearance requirements, and the like, of the anti-peep display screen, and is not limited here. In addition, when the plurality of passive LCD modules 1 are installed in the anti-peep display screen, the structural design of the first sub-electrodes 111 of the multiple passive LCD modules 1 remains consistent.

In the embodiment provided by the present application, when the anti-peep display screen includes a plurality of passive LCD modules 1, as shown in FIG. 5, a compensation film 4 is disposed between adjacent passive LCD modules 1, and the compensation film 4 is a half-wave plate.

Specifically, the compensation film 4 is a ½ half-wave plate.

The compensation film 4 is configured to adjust the propagation direction of light and reduce the polarization rotation effect of light in the liquid crystal layer 12 by adjusting the propagation speed of light, thereby reducing the loss of light to increase the brightness of the module and improve the image quality of the anti-peep display screen.

In the embodiment provided by the present application, in order to further improve the image quality, as shown in FIGS. 2, 4 and 5, a compensation film 4 is disposed between the adjacent passive LCD module 1 and the color LCD module 2.

It can be understood that in some embodiments, in order to reduce the cost of the anti-peep display screen, the compensation film 4 structure may be omitted.

In the embodiments provided by the present application, the anti-peep display screen also includes a backlight source 3, and the location of the backlight source 3 is not limited.

Figure 18:
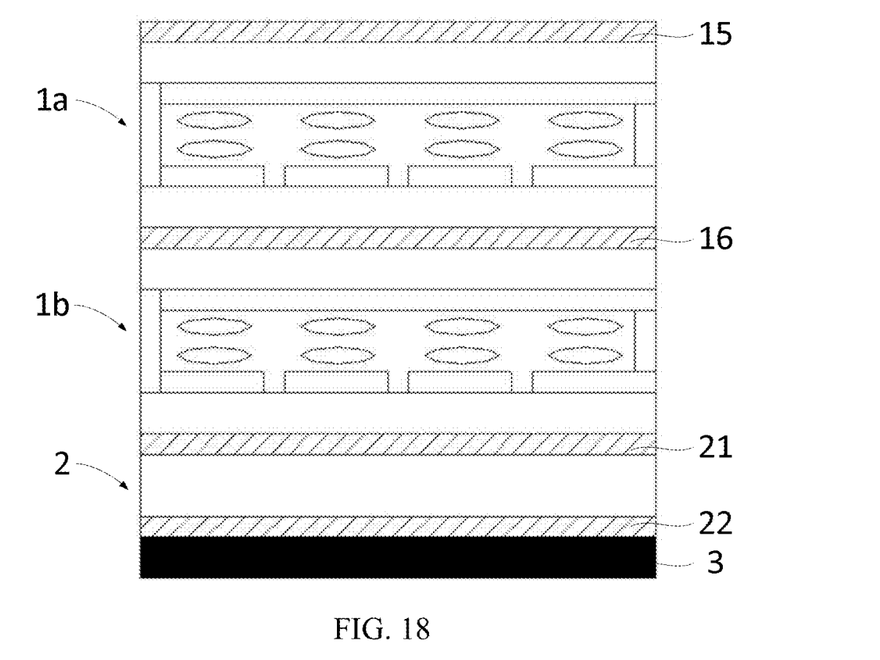
FIG. 18 is a schematic diagram of a stacking structure of a passive LCD module and a color LCD module according to an embodiment of the present application.

In some embodiments, as shown in FIG. 18, the backlight source 3 is disposed on a side of the passive LCD module 1 away from the color LCD module 2 along the first direction.

Figure 19:
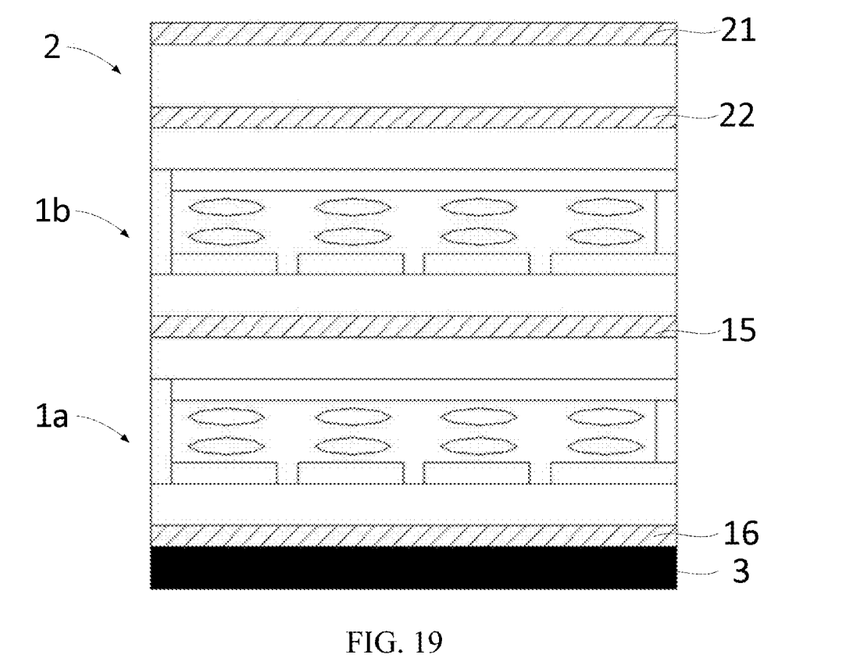
FIG. 19 is a schematic diagram of another stacking structure of a passive LCD module and a color LCD module according to an embodiment of the present application.

In some embodiments, as shown in FIG. 19, the backlight source 3 is disposed on a side of the color LCD module 2 away from the passive LCD module 1.

In the embodiments provided by the present application, the structure of the backlight source 3 is also not limited.

Figure 20:
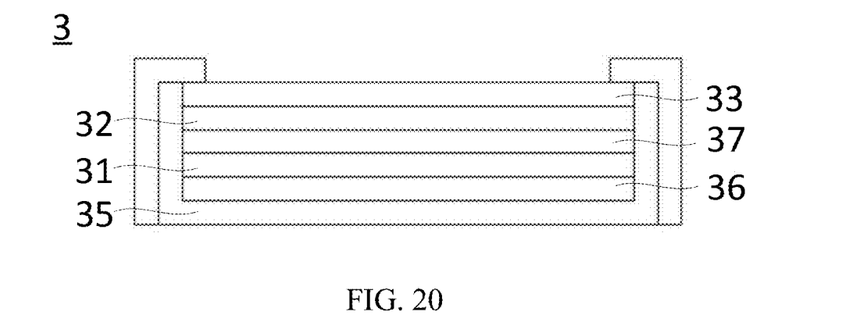
FIG. 20 is a schematic structural diagram of a backlight source including a first light-enhancing film and a second light-enhancing film according to an embodiment of the present application.

In some embodiments, as shown in FIG. 20, the backlight source 3 includes a light source 31, a first light-enhancing film 32, and a second light-enhancing film 33 disposed along the first direction an angle between the optical axes of the first light-enhancing film 32 and the second light-enhancing film 33 is 0°-90°.

The light source 31 may be a direct light source or an edge-type light source, and the light source 31 includes a light emitting component and a light guiding plate.

The angle between the first light-enhancing film 32 and the second light-enhancing film 33 is designed according to the actual situation. Optionally, in one embodiment, the angle between the first light-enhancing film 32 and the horizontal line is designed to be 90°-110°, and the angle between the second light-enhancing film 33 and the horizontal line is designed to be 10°-30°.

The light-enhancing film is disposed in front of the light source 31, which can diffuse and evenly distribute light, and focus the light in the front direction, thereby improving the brightness and uniformity of the light emitted by the backlight source 3.

With the above design, the first light-enhancing film 32 and the second light-enhancing film 33 are stacked and cooperate with each other, which further improves the diffusion effect and brightness of the backlight source 3, thereby achieving higher brightness, better uniformity and wider viewing angle. This enables the anti-peep display to achieve a better display effect.

Figure 21:
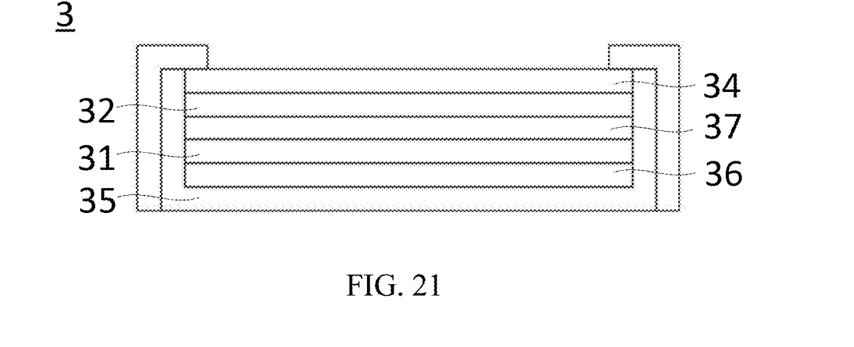
FIG. 21 is a schematic structural diagram of another backlight source including a first light-enhancing film and a brightness-enhancing film according to an embodiment of the present application.

In some embodiments, as shown in FIG. 21, the backlight source 3 includes a light source 31, a first light-enhancing film 32 and a brightness-enhancing film 34 disposed along a first direction, and an angle between the optical axes of the first light-enhancing film 32 and the brightness-enhancing film 34 is 0°-90°.

The brightness-enhancing film 34 is disposed in front of the light source 31, which has certain reflection control capabilities, and can be used to increase the brightness and contrast of the backlight source 3.

The angle between the first light-enhancing film 32 and the brightness-enhancing film 34 is designed according to the actual situation. When the angle between the optical axes of the first light-enhancing film 32 and the brightness-enhancing film 34 is 0°, that is, when the optical axes of the two film layers are designed to be horizontal, an optimum enhancing effect can be obtained.

With the above design, the first light-enhancing film 32 and the second light-enhancing film 33 are stacked and cooperate with each other, which can improve the diffusion effect and brightness of the backlight source 3 and increase the contrast, thereby improving the clarity and vibrance of the display image of the anti-peep display screen.

It should be noted that the backlight source 3 also includes a bracket 35, a reflective film 36, a scattering film 37 and so on, which can be referred to the existing technology and will not be repeated here.

In the embodiment provided by the present application, the passive LCD module 1 and the color LCD module 2 also include a polarizer structure, and the arrangement of the polarizer is not limited.

In some embodiments, in order to reduce the thickness and manufacturing cost of the anti-peep display screen, adjacent display modules may share the same polarizer.

In the embodiment shown in FIG. 18, the anti-peep display screen includes a first passive LCD module 1a, a second passive LCD module 1b, a color LCD module 2, and a backlight source 3 arranged in sequence. The first passive LCD module 1a includes a first surface polarizer 15 and a first bottom polarizer 16, and the color LCD module 2 includes a second surface polarizer 21 and a second bottom polarizer 22. The first bottom polarizer 16 is also used as the surface polarizer of the second passive LCD module 1b, and the second surface polarizer 21 is also used as the bottom polarizer of the second passive LCD module 1b.

In the embodiment shown in FIG. 19, the anti-peep display screen includes a backlight source 3, a first passive LCD module 1a, a second passive LCD module 1b, and a color LCD module 2 arranged in sequence. The first passive LCD module 1a includes a first surface polarizer 15 and a first bottom polarizer 16, and the color LCD module 2 includes a second surface polarizer 21 and a second bottom polarizer 22. The first surface polarizer 15 is also used as the bottom polarizer of the second passive LCD module 1b, and the second bottom polarizer 22 is also used as the surface polarizer of the second passive LCD module 1b.

In some embodiments, the thickness requirements for the anti-peep display screen are low. In order to reduce manufacturing difficulty, independent surface polarizers and bottom polarizers can be configured for each group of the passive LCD module 1 and color LCD module 2, which can refer to the existing technology and will not be repeated here.

In the embodiment provided by the present application, as shown in FIG. 6, the passive LCD module 1 is also equipped with a glass substrate 14 for arranging the electrode layer structure.

In the embodiment provided by the present application, as shown in FIG. 1, the anti-peep display screen also includes a cover plate 5, and a special coating or functional film is applied on the surface of the cover plate 5. The special coatings and functional films may be one or a combination of an anti-glare, anti-reflective, and anti-fingerprint film.

In summary, the anti-peep display screen provided by the present application combines the passive LCD module 1 and the color LCD module 2. By controlling the light transmission state of the passive LCD module 1, the on/off of the anti-peep function of the anti-peep display screen can be achieved. By improving the structure of the first electrode layer 11 and the second electrode layer 13 in the passive LCD module 1, the first electrode layer 11 is configured with a plurality of independent first sub-electrodes 111, and the second electrode layer 13 is configured with a plurality of independent second sub-electrodes 131, this can realize the partial anti-peep effect and multi-area independent control of the anti-peep function in the anti-peep display screen.

Embodiment 2

This embodiment provides an anti-peep display screen. The difference from the proposal provided in Embodiment 1 is that: as shown in FIGS. 10 to 13, the first electrode layer 11 in the passive LCD module 1 includes a plurality of first sub-electrodes 111 and the second electrode layer 13 include one second sub-electrode 131, and a projection of the second sub-electrode 131 on the first electrode layer 11 covers the plurality of first sub-electrodes 111.

Figure 10:
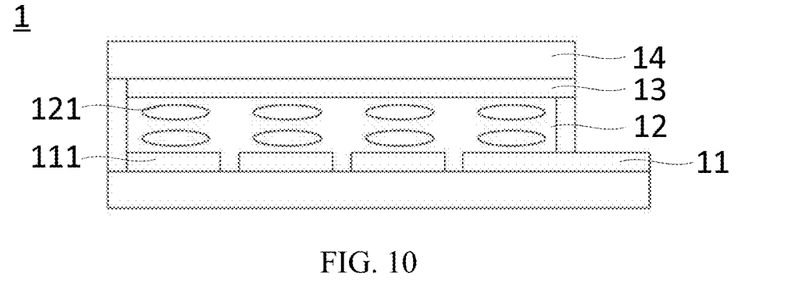
FIG. 10 is a schematic structural diagram of an electronically controlled birefringence passive LCD module when the anti-peep function is turned off according to Embodiment 2 of the present application.
Figure 11:
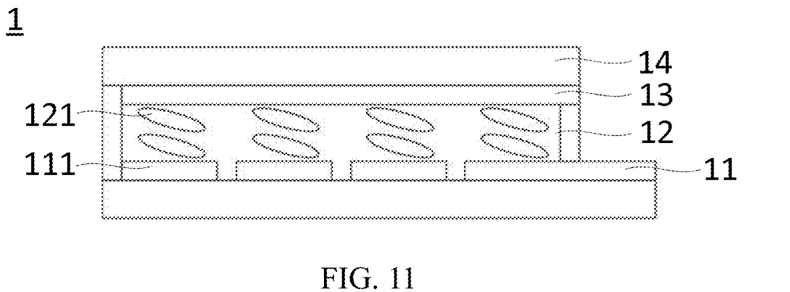
Figure 12:
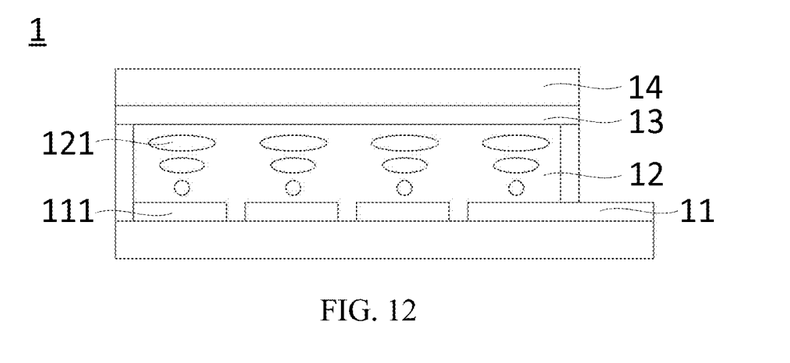
FIG. 12 is a schematic structural diagram of a vertical nematic passive LCD module when the anti-peep function is turned off according to Embodiment 2 of the present application.
Figure 13:
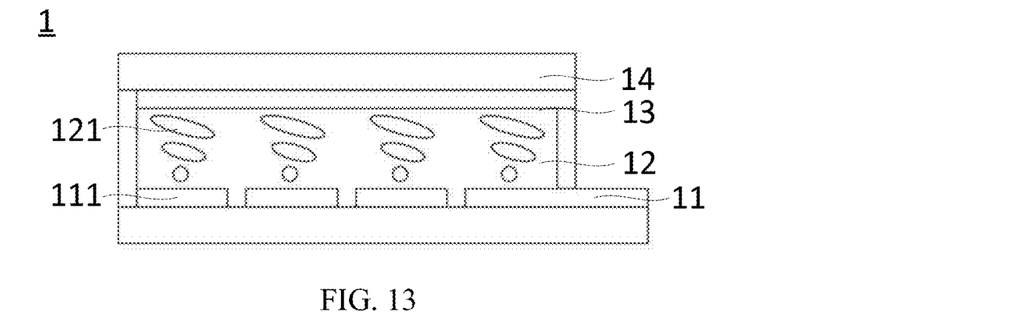

FIGS. 10 and 11 show an electronically controlled birefringence passive LCD module 1. FIGS. 12 and 13 show a vertical nematic passive LCD module 1.

In practical applications, by individually regulating the input voltages of the plurality of first sub-electrodes 111 in the first electrode layer 11, a partitioned adjustment of the anti-peep function is achieved.

With the above design, the second electrode layer 13 has an integrated-surface structure, so that the processing and manufacturing difficulty of the anti-peep display screen can be reduced.

Embodiment 3

This embodiment provides an anti-peep display screen. The difference from the proposal provided in Embodiment 1 is that: as shown in FIGS. 14 to 17, the first electrode layer 11 in the passive LCD module 1 includes a first sub-electrode 111, and the second electrode layer 13 includes a second sub-electrode 131 corresponding to the first sub-electrode 111.

Figure 14:
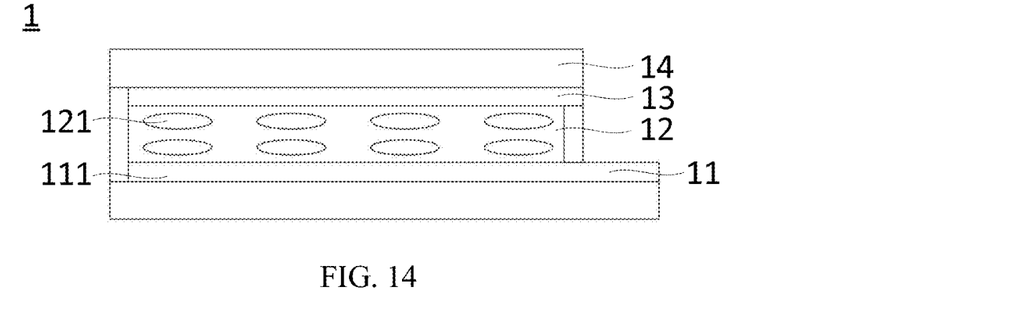
FIG. 14 is a schematic structural diagram of an electronically controlled birefringence passive LCD module when the anti-peep function is turned off according to Embodiment 3 of the present application.
Figure 15:
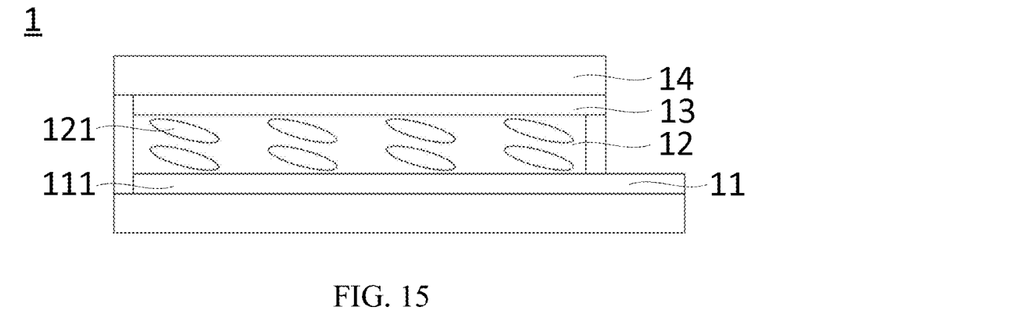

FIGS. 14 and 15 show an electronically controlled birefringence passive LCD module 1.

Figure 16:
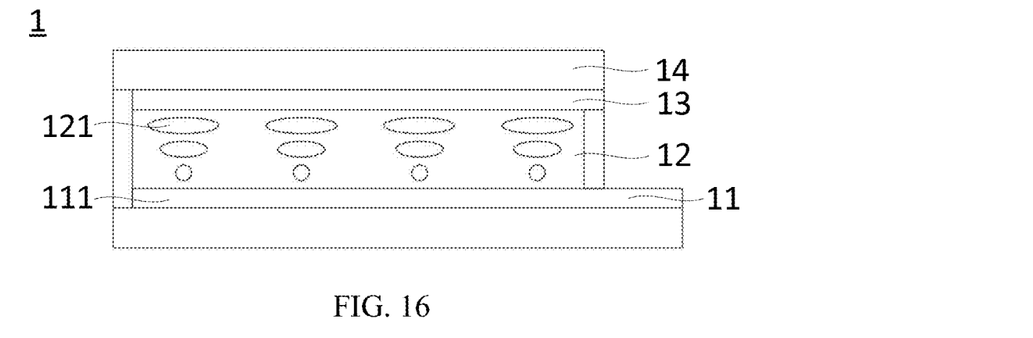
FIG. 16 is a schematic structural diagram of a vertical nematic passive LCD module when the anti-peep function is turned off according to Embodiment 3 of the present application.
Figure 17:
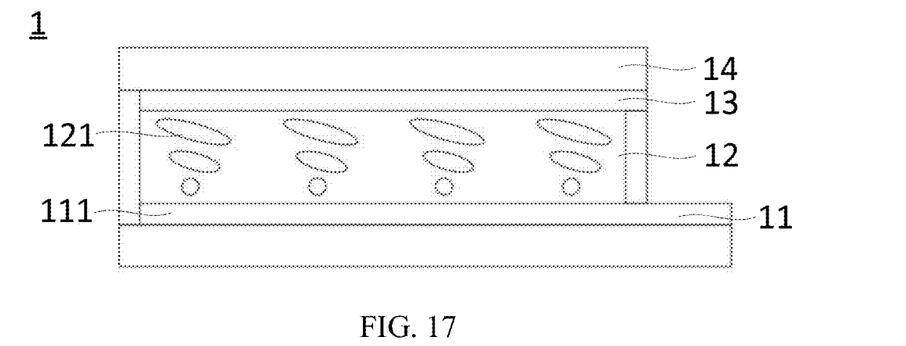

FIGS. 16 and 17 show a vertical nematic passive LCD module 1.

In some small-sized products, both the first sub-electrode 111 and the second sub-electrode 131 may be designed as an integrated structure, and adjusting the voltage difference between the first sub-electrode 111 and the second sub-electrode 131 allows the screen to switch between anti-peep and non-anti-peep modes.

Embodiment 4

This embodiment provides a vehicle-mounted display device, including any one of the anti-peep display screens in Embodiment 1 to Embodiment 3.

The vehicle-mounted display device also includes structures such as a housing, a power supply, a fixed bracket.

The vehicle-mounted display device provided by the present application improves the structure of the anti-peep display screen. On the one hand, by combining a passive LCD module 1 with a color LCD module 2 and utilizing the passive LCD module 1 to turn on or off the anti-peep function, the image display quality of the vehicle-mounted display device can be effectively improved; on the other hand, in some situations, the structure of the sub-electrodes in the passive LCD module 1 is allowed to be customized to realize various forms of anti-peep function.

For example, in the anti-peep display screen provided in Embodiment 2, the anti-peep function of multiple areas can be turned on or off independently, so that it can be applied in a variety of scenarios, having a variety of using methods and high security.

For example, the above-mentioned vehicle-mounted display device may be configured at the passenger seat. If it is allowed by the traffic conditions, the anti-peep function of the display screen can be turned off and the on-board display device can be switched to a sharing mode so that the driver and passengers can see different content respectively; if it is not allowed by the traffic conditions, the anti-peep function of the area of the display screen close to the driver's side can be turned on, and the anti-peep function of other areas of the display screen can be turned off, so that the on-board display device can be switched to the anti-peep mode so that passengers can browse multimedia content without affecting the driving safety of the driver, thereby providing entertainment services to the front-seat passenger.

Embodiment 5

This embodiment provides a vehicle, including the vehicle-mounted display device in Embodiment 4.

The vehicle provided by the present application can provide more entertainment services to the front-seat passenger without affecting the driving safety of the driver by designing a vehicle-mounted display module with anti-peep function.

The above-described embodiments are only used to illustrate the technical proposals of the present application, but not to limit them. Although the present application has been described in detail with reference to the foregoing embodiments, those of ordinary skill in the art should understand that the technical proposals described in the foregoing embodiments can be modified, or some of the technical features can be replaced by their equivalents; and these modifications or substitutions do not cause the essence of the corresponding technical proposals to deviate from the spirit and scope of the technical proposals in the embodiments of the present application, and should fall within the protection scope of the present application.

What is claimed is:

1. An anti-peep display screen, comprising:
a passive liquid crystal display module and a color liquid crystal display module stacked along a first direction;
wherein, the passive liquid crystal display module comprises a first electrode layer, a liquid crystal layer and a second electrode layer, the first electrode layer comprises a plurality of first sub-electrodes, the second electrode layer comprises a plurality of second sub-electrodes, and the plurality of first sub-electrodes are opposite to the plurality of second sub-electrodes, and is/are configured to receive the same or different voltages, so as to control a light transmission state of the passive liquid crystal display module in areas where the plurality of first sub-electrodes are located;
wherein the passive liquid crystal display module is a twisted nematic display module; and
wherein a pretilt angle of liquid crystal molecules in the twisted nematic display module is 1°-7°, a twist angle thereof is 80°-100°, and a retardation is 500 nm-1200 nm;
wherein the plurality of first sub-electrodes are arranged in an array, and a spacing between two adjacent first sub-electrodes of the plurality of first sub-electrodes is 3 μm-10 μm;
wherein each of the plurality of second sub-electrodes has the same size as each of the plurality of first sub-electrodes, and the plurality of second sub-electrodes are arranged corresponding to the plurality of first sub-electrodes, respectively.

2. The anti-peep display screen according to claim 1, wherein the number of the passive liquid crystal display module in the anti-peep display screen is one or two.

3. The anti-peep display screen according to claim 2, wherein the anti-peep display screen comprises two passive liquid crystal display modules, and a compensation film which is a half-wave plate is disposed between the two passive liquid crystal display modules.

4. The anti-peep display screen according to claim 1, wherein the color liquid crystal display module comprises a plurality of pixel electrodes, and at least one of the plurality of first sub-electrodes is arranged corresponding to at least one of the plurality of pixel electrodes.

5. The anti-peep display screen according to claim 1, wherein a compensation film is provided between the passive liquid crystal display module and adjacent color liquid crystal display module, and the compensation film is a half-wave plate.

6. The anti-peep display screen according to claim 1, wherein the anti-peep display screen further comprises a backlight source, and the backlight source comprises a light source, a first light-enhancing film, and a second light-enhancing film disposed along the first direction, an angle between optical axes of the first light-enhancing film and the second light-enhancing film is 0°-90°;
alternatively,
the backlight source comprises a light source, a first light-enhancing film, and a brightness-enhancing film disposed along the first direction, and an angle between optical axes of the first light-enhancing film and the brightness-enhancing film is 0°-90°.

7. A vehicle-mounted display device, comprising an anti-peep display screen, wherein the anti-peep display screen, comprises:
a passive liquid crystal display module and a color liquid crystal display module stacked along a first direction;
wherein, the passive liquid crystal display module comprises a first electrode layer, a liquid crystal layer and a second electrode layer, the first electrode layer comprises a plurality of first sub-electrodes, the second electrode layer comprises a plurality of second sub-electrodes, and the plurality of first sub-electrodes are opposite to the plurality of second sub-electrodes and are configured to receive different voltages, so as to control a light transmission state of the passive liquid crystal display module where the plurality of first sub-electrodes are located;
wherein the passive liquid crystal display module is a twisted nematic display module; and
wherein a pretilt angle of liquid crystal molecules in the twisted nematic display module is 1°–7°, a twist angle thereof is 80°-100°, and a retardation is 500 nm-1200 nm;
wherein the plurality of first sub-electrodes are arranged in an array, and a spacing between two adjacent first sub-electrodes of the plurality of first sub-electrodes is 3 μm-10 μm;
wherein each of the plurality of second sub-electrodes has the same size as each of the plurality of first sub-electrodes, and the plurality of second sub-electrodes are arranged corresponding to the plurality of first sub-electrodes, respectively.

8. The vehicle-mounted display device according to claim 7, wherein the number of the passive liquid crystal display module in the anti-peep display screen is one or two.

9. The vehicle-mounted display device according to claim 8, wherein the anti-peep display screen comprises two passive liquid crystal display modules, and a compensation film which is a half-wave plate is disposed between the two passive liquid crystal display modules.

10. A vehicle, comprising the vehicle-mounted display device according to claim 7.

* * * * *